United States Patent
MacDonald et al.

(10) Patent No.: US 11,815,023 B2
(45) Date of Patent: Nov. 14, 2023

(54) POWER AND EJECTOR COOLING UNIT

(71) Applicant: Hamilton Sundstrand Corporation, Charlotte, NC (US)

(72) Inventors: Malcolm MacDonald, Bloomfield, CT (US); Abbas A. Alahyari, Glastonbury, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 17/508,300

(22) Filed: Oct. 22, 2021

(65) Prior Publication Data
US 2023/0132248 A1    Apr. 27, 2023

(51) Int. Cl.
| | |
|---|---|
| F02C 6/18 | (2006.01) |
| F02C 7/18 | (2006.01) |
| F02C 1/10 | (2006.01) |
| F02C 7/10 | (2006.01) |

(52) U.S. Cl.
CPC .............. *F02C 7/185* (2013.01); *F02C 1/105* (2013.01); *F02C 6/18* (2013.01); *F02C 7/10* (2013.01); *F05D 2210/13* (2013.01); *F05D 2220/323* (2013.01); *F05D 2220/76* (2013.01); *F05D 2260/213* (2013.01); *F05D 2260/232* (2013.01); *F05D 2260/601* (2013.01)

(58) Field of Classification Search
CPC ...... F02C 3/34; F02C 3/32; F02C 7/32; F02C 7/143; F02C 6/08; F02C 6/18; F23R 3/36; B64D 2013/0648; B64D 2013/0618
See application file for complete search history.

(56) References Cited

U.S. PATENT DOCUMENTS

| | | | |
|---|---|---|---|
| 8,991,183 B2* | 3/2015 | Stiesdal | F02C 6/14 60/659 |
| 9,127,598 B2* | 9/2015 | Snook | F02C 3/34 |
| 9,410,451 B2 | 8/2016 | Laing et al. | |
| 10,082,049 B2* | 9/2018 | Lee | F01K 25/103 |
| 10,385,735 B2 | 8/2019 | Stapp | |
| (Continued) | | | |

FOREIGN PATENT DOCUMENTS

WO    2020035470 A1    2/2020

OTHER PUBLICATIONS

Extended European Search Report; dated Mar. 21, 2023; EP Application No. 22202317.8-1002; 7 pages.
(Continued)

*Primary Examiner* — Thuyhang N Nguyen
(74) *Attorney, Agent, or Firm* — CANTOR COLBURN LLP (57) ABSTRACT

Power and cooling systems including a drive system, a power generation unit, and a cooled fluid generation unit. A primary working fluid that is expanded within a turbine of the drive system and compressed within compressors in a closed-loop cycle. The power generation unit includes a generator and a heat source configured to heat the primary working fluid prior to injection into the turbine. T cooled fluid generation unit includes an ejector downstream of the compressors and a separator arranged downstream of the ejector and configured to separate liquid and gaseous portions of the primary working fluid. The gaseous portion is directed to the compressors and the liquid portion is directed to an evaporator heat exchanger to generate cooled fluid.

20 Claims, 4 Drawing Sheets

(56) References Cited

U.S. PATENT DOCUMENTS

| | | | |
|---|---|---|---|
| 10,711,733 B1 | 7/2020 | Notarnicola et al. | |
| 10,787,963 B2* | 9/2020 | Amos | F02C 9/18 |
| 10,975,766 B2* | 4/2021 | Allam | F25J 3/04018 |
| 11,365,679 B2* | 6/2022 | Allam | F02C 3/34 |
| 2013/0104525 A1* | 5/2013 | Allam | F25J 3/04618 |
| | | | 60/273 |
| 2014/0000274 A1* | 1/2014 | Srinivasan | F02C 3/22 |
| | | | 60/776 |
| 2016/0096629 A1 | 4/2016 | Vaisman | |
| 2016/0348539 A1 | 12/2016 | Peter et al. | |
| 2016/0369658 A1 | 12/2016 | Lee et al. | |
| 2018/0045119 A1* | 2/2018 | Sheridan | F02K 3/06 |
| 2018/0057172 A1* | 3/2018 | Sautron | F02C 3/04 |
| 2019/0049174 A1* | 2/2019 | Groenendijk | F25J 1/0042 |
| 2021/0388764 A1* | 12/2021 | Forrest | F02C 1/08 |

OTHER PUBLICATIONS

Liao et al.; "Effects of Technical Progress on Performance and Application of Supercritical Carbon Dioxide Power Cycle: A Review"; Energy Conversion and Management; Elservier Science Publishers, Oxford, GB; 199; pp. 1-23; Aug. 31, 2019.

Zhang et al.; "Thermodynamic Analysis and Multi-Objective Optimization of a Transcritical CO2 Waste Heat Recovery System for Cruise Ship Application"; Energy Conversion and Management;Elservier Science Publishers, Oxford, GB; 227; pp. 1-15; Nov. 5, 2020.

* cited by examiner

POWER AND EJECTOR COOLING UNIT

BACKGROUND

The subject matter disclosed herein generally relates to power generation and cooling and, more particularly, to power and ejector cooling units using supercritical $CO_2$.

Generators (e.g., diesel generators, gas turbine engines, etc.) are used to generate power. Such systems may be used to power cooling units to generate cooled fluid (e.g., air, gases, or liquids) for a designated space (e.g., building, aircraft cabin, etc.) or for other purposes (e.g., cooling fluids to cool electronics or other components and/or systems). These generators conventionally burn fuels, such as diesel or jet fuel, to generate heated air that drives turbines and compressors to move air through the generator and spin a shaft, which may be operably arranged to generate power.

Alternative power generation systems may be operated using supercritical $CO_2$. Power generation cycles with a supercritical $CO_2$ bottoming cycle are more efficient than conventional approaches that can decrease fuel burn and are financially attractive. Such systems can represent a potential solution for aerospace applications where space and weight are limiting and in forward operating bases where agility and compactness are paramount. Improved supercritical $CO_2$ systems may be desirable to improve efficiencies and utility of such power generation systems.

SUMMARY

According to some embodiments power and cooling systems are provided. The power and cooling systems include a drive system having a drive shaft with a turbine, a first compressor, and a second compressor each operably coupled to the drive shaft. A power generation unit defines a power generation flow path of a primary working fluid that is expanded within the turbine of the drive system and compressed within the first compressor and the second compressor in a closed-loop cycle. The power generation unit includes a generator configured to generate electrical power, the generator driven by the drive shaft of the drive system and a heat source configured to heat the primary working fluid prior to injection into the turbine. A cooled fluid generation unit defines a cooled fluid flow path of a portion of the primary working fluid that is extracted from the second compressor and compressed within the first compressor. The cooled fluid generation unit includes an ejector downstream of the second compressor along the cooled fluid flow path and a separator arranged downstream of the ejector and configured to separate liquid and gaseous portions of the primary working fluid, wherein the gaseous portion is directed to the first compressor and the liquid portion is directed to an evaporator heat exchanger to generate a cooled fluid, wherein the primary working fluid is directed to the ejector after passing through the evaporator heat exchanger.

In addition to one or more of the features described herein, or as an alternative, further embodiments of the power and cooling systems may include that the heat source is a combustion system and waste heat from the combustion system is passed through a hot gas-heat exchanger that is configured to heat the primary working fluid upstream of the turbine along the power generation flow path.

In addition to one or more of the features described herein, or as an alternative, further embodiments of the power and cooling systems may include that the combustion system is a gas turbine engine.

In addition to one or more of the features described herein, or as an alternative, further embodiments of the power and cooling systems may include that the gas turbine engine is configured to generate propulsive force for flight of an aircraft.

In addition to one or more of the features described herein, or as an alternative, further embodiments of the power and cooling systems may include that the combustion system is a diesel engine.

In addition to one or more of the features described herein, or as an alternative, further embodiments of the power and cooling systems may include that the heat source is a burner configured to heat the primary working fluid.

In addition to one or more of the features described herein, or as an alternative, further embodiments of the power and cooling systems may include that the primary working fluid is supercritical $CO_2$.

In addition to one or more of the features described herein, or as an alternative, further embodiments of the power and cooling systems may include that the cooled fluid generation unit comprises a condenser heat exchanger arranged between the second compressor and the ejector along the cooled fluid flow path.

In addition to one or more of the features described herein, or as an alternative, further embodiments of the power and cooling systems may include that the condenser heat exchanger receives ambient air as a secondary working fluid to cool the primary working fluid prior to entry into the ejector.

In addition to one or more of the features described herein, or as an alternative, further embodiments of the power and cooling systems may include that the cooled fluid generation unit comprises an expansion valve arranged between the separator and the evaporator heat exchanger.

In addition to one or more of the features described herein, or as an alternative, further embodiments of the power and cooling systems may include that the power generation unit comprises a recuperator heat exchanger arranged downstream from the turbine along the power generation flow path, wherein the recuperator heat exchanger is configured to receive two separate flows of the primary working fluid to enable heat exchange therebetween.

In addition to one or more of the features described herein, or as an alternative, further embodiments of the power and cooling systems may include that the power generation system comprises a heat rejection heat exchanger arranged downstream of the recuperator heat exchanger and upstream of the first condenser.

In addition to one or more of the features described herein, or as an alternative, further embodiments of the power and cooling systems may include a heat rejection heat exchanger arranged between the first compressor and the second compressor and configured to cool the primary working fluid.

In addition to one or more of the features described herein, or as an alternative, further embodiments of the power and cooling systems may include a blower configured to direct air into the heat rejection heat exchanger, wherein the blower is powered by the generator.

In addition to one or more of the features described herein, or as an alternative, further embodiments of the power and cooling systems may include that the cooled fluid is cooled air that is supplied to a passenger cabin of an aircraft.

In addition to one or more of the features described herein, or as an alternative, further embodiments of the power and cooling systems may include that the cooled fluid is cooled air that is supplied to a room of a building.

In addition to one or more of the features described herein, or as an alternative, further embodiments of the power and cooling systems may include an additional compressor arranged between the first compressor and the second compressor along the drive shaft.

In addition to one or more of the features described herein, or as an alternative, further embodiments of the power and cooling systems may include that the primary working fluid of the cooled fluid generation unit is merged with the primary working fluid of the power generation unit within the first compressor.

In addition to one or more of the features described herein, or as an alternative, further embodiments of the power and cooling systems may include that the primary working fluid of the cooled fluid generation unit is merged with the primary working fluid of the power generation unit within the additional compressor.

In addition to one or more of the features described herein, or as an alternative, further embodiments of the power and cooling systems may include that the portion of the primary working fluid that is extracted to the cooled fluid generation unit comprises no more than 20% of the primary working fluid within the power and cooling system.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Power generation cycles with a supercritical fluid bottoming cycle, as described herein, are more efficient than conventional approaches for generating power (e.g., diesel and/or gas turbines). The supercritical fluid may be, for example and without limitation, carbon dioxide ($sCO_2$), helium, nitrogen, noble gases, water, or other fluids, and mixtures thereof. These systems can decrease fuel burn and may be financially attractive due to lower operating costs, less fuel consumption, etc. The systems described herein may be implemented in, for example and without limitation, aerospace applications where space and weight are limiting and in forward operating bases where agility and compactness are paramount.

Embodiments of the present disclosure enable a dual purpose system, providing both power and cooling. As such, embodiments of the present disclosure may enable replacing multiple other components with a single, integrated system, and provide combined system benefits. Some embodiments of the present disclosure are directed to power generation and cooling systems that are configured to run off waste heat, which is essentially free energy to produce the power and the cooling. In some embodiments, the power generation and cooling systems may be configured to be run off or operated using a burner to produce heat to drive the systems described herein. Advantageously, embodiments of the present disclosure employ a zero ozone depletion potential (ODP) working fluid (i.e., $CO_2$).

Waste heat from diesel generators or gas turbine engines have a high temperature exhaust that is expunged out of the exhaust and is essentially lost energy. Embodiments of the present disclosure are directed to capturing this waste heat and converting it to generate power and cooling using a power and cooling system (e.g., power and cooling unit (PCU)) that employs a closed-loop supercritical fluid (e.g., $CO_2$ ($sCO_2$)) to generate both power and cooled fluid for distribution to a space, environment, or other systems (e.g., as a cooling fluid within such systems).

Figure 1:
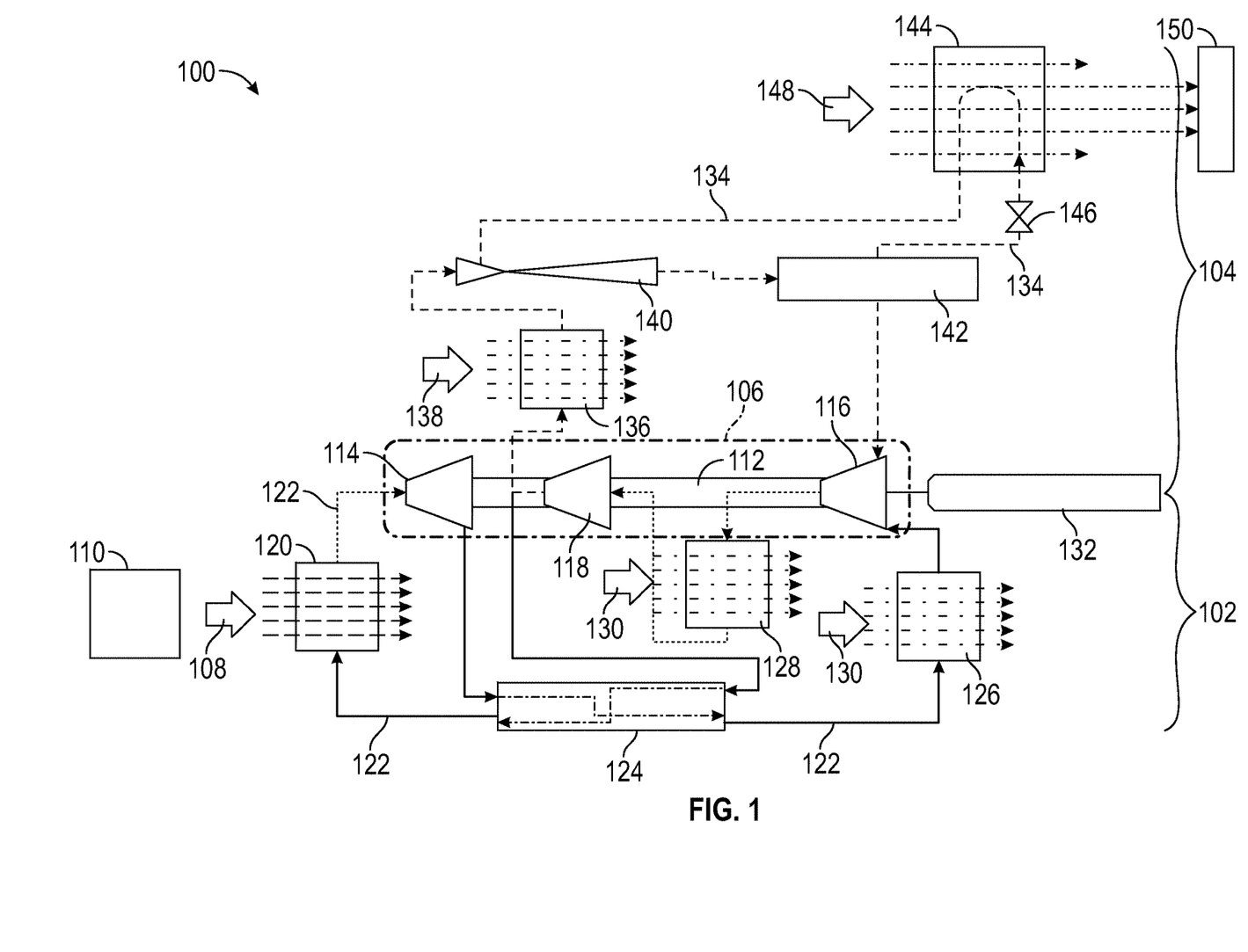
FIG. 1 is a schematic diagram of a power and cooling system in accordance with an embodiment of the present disclosure.

Referring now to FIG. 1, a schematic illustration of a power and cooling system 100 in accordance with an embodiment of the present disclosure is shown. The power and cooling system 100 is configured to generate power and generate cooled fluid for cooling a space, environment, or components. The cooled fluid may be air, gases, liquids, or other fluids which may be distributed to various locations or passes through cooling systems of components or systems. The power and cooling system 100 has a power generation unit 102 and a cooled fluid generation unit 104, which are each operably connected to a central drive system 106. The power and cooling system 100 is configured to operate in a substantially closed-loop configuration using a supercritical primary working fluid (e.g., $sCO_2$). The driving force of the closed-loop system is capture and use of waste heat 108 from a combustion system 110. The combustion system 110 may be a gas turbine engine (e.g., onboard an aircraft), a gas furnace, gas combustor, burner, or the like. The combustion system 110 generates heated air or combustion output during operation. This heated air can be used to cause a change in the primary working fluid of the power and cooling system 100, such as a phase change in a working fluid or increase a temperature of a supercritical fluid.

The drive system 106, of this illustrative embodiment, includes a drive shaft 112, a turbine 114, a first compressor 116, and a second compressor 118. The turbine 114 and the first and second compressors 116, 118 are operably coupled to the drive shaft 112. Rotation of the turbine 114 will cause rotation of the drive shaft 112, which in turn drives rotation of the first and second compressors 116, 118. The turbine 114 and the compressors 116, 118 form portions of flow paths associated with the power generation unit 102 and the cooled fluid generation unit 104. The turbine 114 is configured to expand the primary working fluid and extract work therefrom. The compressors 116, 118 are configured to compress the primary working fluid.

The power generation unit 102 includes a hot gas-heat exchanger 120 that is configured to receive waste heat 108 from the combustion system 110. The waste heat 108 is used to heat the primary working fluid within the hot gas-heat exchanger 120. The heated primary working fluid is then passed along a power generation flow path 122 to the turbine 114. The primary working fluid is then expanded within the turbine 114 and work is extracted therefrom to drive rotation of the drive shaft 112. The hot and expanded primary working fluid is then directed to a recuperator heat exchanger 124, where the primary working fluid is cooled. The cooled primary working fluid is then directed through a first heat rejection heat exchanger 126, into and through the first compressor 116, through a second heat rejection heat exchanger 128, into and through the second compressor 118, back through the recuperator heat exchanger 124, and finally back to the hot gas-heat exchanger 120. The first and second heat rejection heat exchangers 126, 128 may employ air or other first secondary working fluid 130 to pick up heat from the primary working fluid. As a result of the compressors 116, 118 and the heat exchangers 124, 126, 128, the primary working fluid is relatively cool when it enters the hot gas-heat exchanger 120 during the closed-loop cycle of the power generation unit 102.

The closed-loop cycle of the power generation unit 102 drives rotation of the turbine 114. As noted, the turbine 114 drives rotation of the drive shaft 112. The drive shaft 112 may be coupled to a generator 132. The generator 132 may be configured to generate electrical power, as will be appreciated by those of skill in the art (e.g., rotation of a rotor relative to a stator). As such, the power generation unit 102 is configured to generate usable electrical power.

The cooled fluid generation unit 104 is also operably coupled to the drive system 106. A cooled fluid flow path 134 passes through each of the first compressor 116 and the second compressor 118 and the second heat rejection heat exchanger 128 of the power generation unit 102. At the second compressor 118 of the drive system 106, the flow paths 122, 134 are split so that a portion of the primary working fluid is directed into the cooled fluid flow path 134. The relatively cool and compressed primary working fluid is directed into a condenser heat exchanger 136, which may employ air as a secondary working fluid 138, to condense the primary working fluid into a liquid state.

The condensed primary working fluid is then directed into an ejector 140. Within the ejector 140, the liquid primary working fluid is mixed with a recycled portion of the primary working fluid and directed into a separator 142. At the separator 142, the primary working fluid is separated into a liquid stream that is sent to an evaporator heat exchanger 144 and a gaseous stream that is sent to the first compressor 116 of the drive system 106. An expansion valve 146 may be arranged between the separator 142 and the evaporator heat exchanger 144. Within the evaporator heat exchanger 144, ambient air 148 is cooled by the liquid primary working fluid and directed to a space 150 to receive the cooled air. In other embodiments, a cooling fluid (e.g., liquid) may be cooled within the evaporator heat exchanger 144 and then supplied to another system to provide cooling thereto. After passing through the evaporator heat exchanger 144, the liquid primary working fluid may be heated sufficiently to transition back to a gaseous state, and this gaseous primary working fluid is directed back to the ejector 140 to be mixed with the liquid primary working fluid received from the condenser heat exchanger 136. In operation, the ejector 140 functions effective as a pump to raise the pressure of one fluid stream using energy from another higher pressure fluid stream, and thus operates as a work recovery device or component within the system.

The gaseous portion of the primary working fluid that is separated at the separator 142 is mixed with the primary working fluid of the power generation unit 102 within the first compressor 116 of the drive system 106. This mixed or combined primary working fluid is compressed in the first compressor 116, passed through the second heat rejection heat exchanger 128, and into the second compressor 118, wherein the two streams of primary working fluid are split for distribution to the power generation unit 102 and the cooled fluid generation unit 104.

In operation, combustion products from the combustion system 110 (e.g., gas turbine engine exhaust, exhaust from diesel engine, etc.) are used to heat the supercritical primary working fluid cycle to produce power along the power generation flow path 122 of the power generation unit 102. The power generation unit 102 is a supercritical working fluid recuperated Brayton cycle that produces power by converting waste heat into power in a turbogenerator (e.g., turbine 114 and generator 132). To accomplish this, high pressure primary working fluid (e.g., $sCO_2$) is heated at the waste-heat heat exchanger 120, expanded to low pressure across the turbine 114 to make power, and cooled in the recuperator heat exchanger 124. As illustrated, the recuperator heat exchanger 124 uses the primary working fluid as both fluids therein, enabling heat exchanger between two streams of the primary working fluid. Heat is rejected at the heat rejection heat exchangers 126, 128 as the primary working fluid is compressed back to high pressure in the compressors 116, 118.

The split stream integration with the cooled fluid generation system 104 is enabled by splitting the outlet/output of the second compressor 118 a coolant stream along the cooled fluid flow path 134, where the primary working fluid is cooled and expanded for use in cooling and a power generation stream along the power generation flow path 122 that completes the power cycle after being heated in the recuperator 124.

The cooling cycle along the cooled fluid flow path 134 operates by extracting a small amount of the primary working fluid from the second compressor 118. For example, in some non-limiting embodiments up to 20% of the total compressor flow may be used for the cooling cycle, although other percentages of total compressor flow may be used without departing from the scope of the present disclosure. The high-pressure primary working fluid extracted from the second compressor 118 is cooled in the condenser heat exchanger 136 and then expanded through the ejector 140. In the ejector 140, a low-pressure stream (from the evaporator heat exchanger 144) is mixed and entrained to produce an intermediate pressure stream entering the separator 142. Example, non-limiting values for pressures in a system in accordance with the present disclosure may be about ~10 MPa for motive, ~3 MPa for suction, and ~4 Mpa for intermediate pressure. It will be appreciated that these may be adjusted or move up or down according to operating conditions and the selected working fluid. From the separator 142, the liquid portion of the primary working fluid is further expanded in the expansion valve 146 and directed to the evaporator heat exchanger 144 for very low temperature cooling, and a vapor portion of the primary working fluid is directed to the first compressor 116 for re-integration with the power cycle.

In one non-limiting example of operation of the cooled fluid generation unit 104, the ambient air 148 may have a relatively high temperature of about 125° F. As the ambient air passes through the evaporator heat exchanger 144, the primary working fluid will extract heat from the air, thus cooling the air. As a result, the air supplied to the space 150 may have a temperature of about 40° F. In other embodiments, rather than cooling ambient air, the cooled fluid generation units of the present disclosure may be configured to cool other gases or liquids which can be used for air conditioning a space, used for cooling components (e.g., electronics), or otherwise distributed such that the cooled fluid may be used to provide cooling and/or to extract heat.

Figure 2:
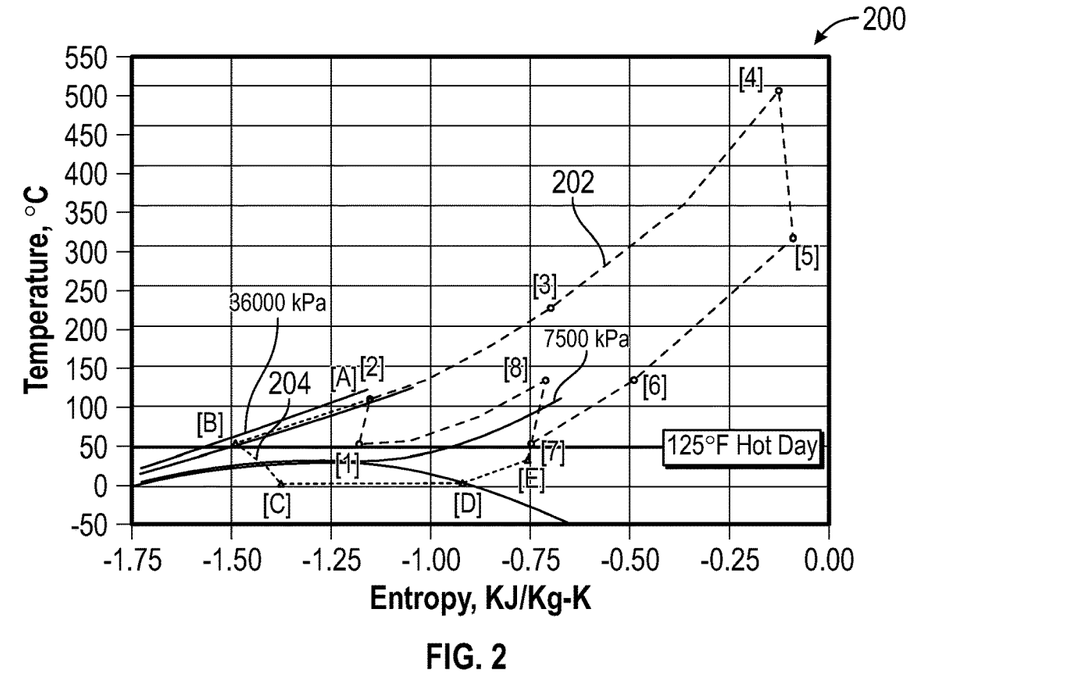
FIG. 2 is a schematic plot of features of operation of power and cooling systems in accordance with embodiments of the present disclosure.
Figure 3:
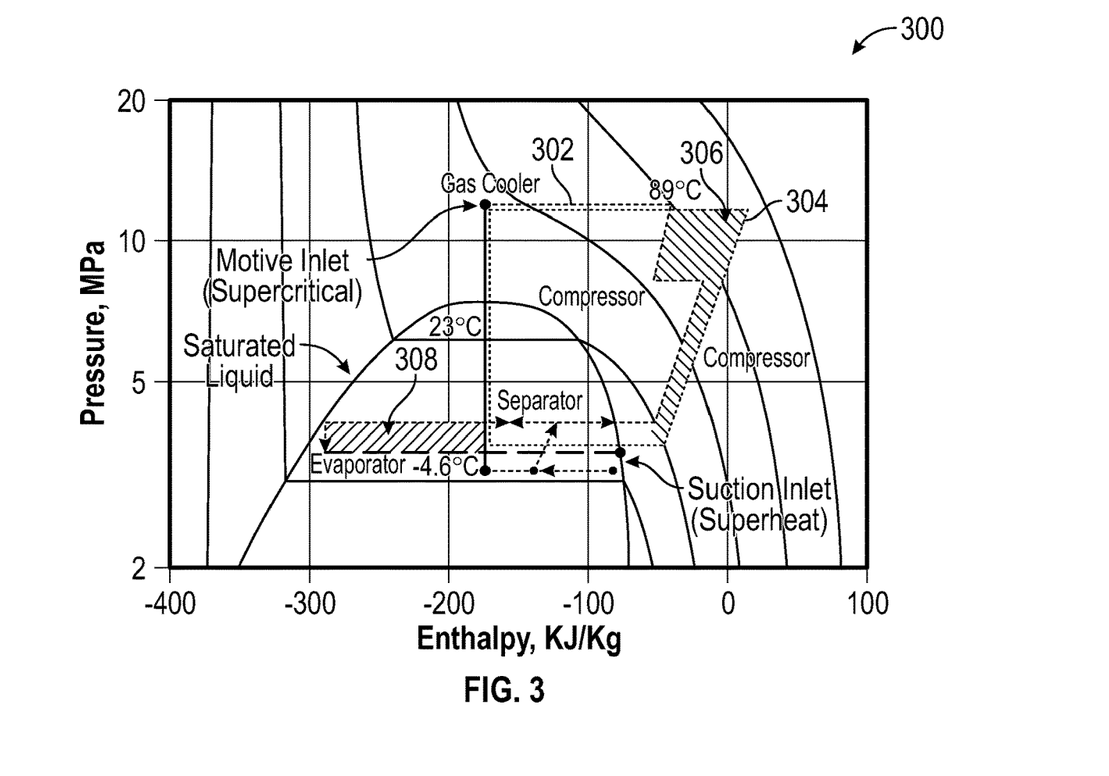
FIG. 3 is a schematic plot of features of operation of power and cooling systems in accordance with embodiments of the present disclosure.

Turning now to FIGS. 2-3, schematic plots of an example of aspects of operation of a power and cooling system in accordance with an embodiment of the present disclosure are shown. Plot 200 of FIG. 2 illustrates entropy as a function of temperature for the split cycles of a power and cooling system in accordance with an embodiment of the present disclosure. Line 202 represents aspects of the power generation unit of the system and line 204 represents aspects of the cooled fluid generation unit of the system. Plot 300 of FIG. 3 illustrates enthalpy as a function of pressure, with line 302 representing the working fluid along the flow path of the cooled fluid generation unit. Line 304 of plot 300 represents a traditional transcritical system. Region 306 represents the improved, and reduced compressor work and region 308 represents the increased cooling capacity, each of which are enabled through use of the ejector-based cooled fluid generation unit, as compared to a conventional system.

Due to the inclusion of the ejector within the cooled fluid generation unit, the low pumping power associated with supercritical working fluids combined with expansion work recovery using the ejector can minimize compression work to deliver high coefficient of performance (COP) cooling. The cooling cycle operates by extracting a small amount of the working fluid stream from the second compressor and passing this extracted portion through the condenser heat exchanger that is cooled with ambient air. The cold high-pressure working fluid is then expanded through the ejector, mixing and entraining a low pressure stream to produce an intermediate pressure stream entering the separator. From the separator, liquid is expanded and directed to the evaporator for very low temperature cooling, and vapor is directed to the compressor for reintegration with the power cycle.

In conventional combined diesel engine-generator machinery (gensets), the engine has often been optimized for transport applications and does not align with the optimal speed for the generator. A compromise is made between the performance of the generator and/or engine at off-design speed or efficiency, resulting in a combined efficiency ~20%. Moreover, cooling is performed separately in a conventional motor driven vapor compression cycle, which requires electricity as an input and uses a high global warming potential (GWP) and high specific volume refrigerant.

In contrast, the power and cooling systems of the present disclosure are configured to generator power and cooling directly and simultaneously from a waste heat stream. Both power and cooling cycles of the power and cooling systems capitalize on the low compression work of supercritical fluids (e.g., $sCO_2$) in a recuperated Brayton cycle and transcritical fluids (e.g., $tCO_2$) in the refrigeration cycle to produce power and cooling at high thermal efficiency and high COP, respectively. That is, in some embodiments of the present disclosure, the power and cooling systems includes a supercritical unit (i.e., the power generation unit) and a transcritical unit (e.g., the cooled fluid generation unit).

The heat exchangers of the power and cooling systems of the present disclosure may have minimal weight and volume for the desired output power and cooling. As described, the power and cooling systems employ waste heat capture and heat rejection, thus the major contributor to weight and volume will be the system heat exchangers. In accordance with one non-limiting example of a power and cooling system in accordance with the present disclosure, a volumetric cooling and power density of 2 $kW/ft^3$ and 1.6 kW/kg, respectively, may be provided, which is approximately a 50% reduction on a state-of-the-art HVAC and auxiliary power unit (APU) systems.

Supercritical working fluids, such as $CO_2$, are extremely dense, which ensures compact but also high-speed turbomachinery, rotating at ~90,000 RPM. In accordance with embodiments of the present disclosure, a compressor efficiency of approximately 75% may be achieved. In accordance with one non-limiting example, the turbo-generator compressor may employ a direct drive generator operating at high speeds with a permanent magnet (PM) to enable compact generators that are approximately 94% efficient and extremely power dense (e.g., 20 kW/kg). In contrast to the diesel gensets (conventional systems), the generator (e.g., generator 132) can be tailored to the power cycle for optimal speed and capacity for optimal performance. The ejector enhanced transcritical working fluid cycle (e.g., cooled fluid generation unit 104), in accordance with one non-limiting example, can achieve an approximate COP of approximately 1.7. The flow splitting of the high pressure supercritical primary working fluid stream performs cooling with no fuel-to-electric and electric-to-cooling conversion losses, thereby delivering combined system efficiency benefits. The combined cycle can achieve compounding benefits due to downsizing of the generator to handle only the power cycle load, which reduces size and weight while also enabling high speed turbomachinery and compact generator configurations. As a result, embodiments of the present disclosure may provide for a compact and portable system with a highly efficient and manageable option that addresses power and cooling needs in a low weight, small footprint that will enable increased operational agility.

The cycle of the power and cooling systems described herein may capitalize on low compression work of supercritical primary working fluids to produce power and cooling at high thermal efficiency (27% vs. 20%) and high COP (1.7 vs. 1.0). In some embodiments and configurations, due to the combined nature of the power generation and fluid cooling in a single system, the systems may occupy significantly smaller footprints (<50%) as compared to traditional systems. Further, through the flow splitting of the primary working fluid stream, the cooling may be achieved with no fuel-to-electric and electric-to-cooling conversion losses, thus delivering combined system benefits. Such benefits can provide compounding benefits enabling downsizing of the generator to handle only the power cycle load.

Figure 4:
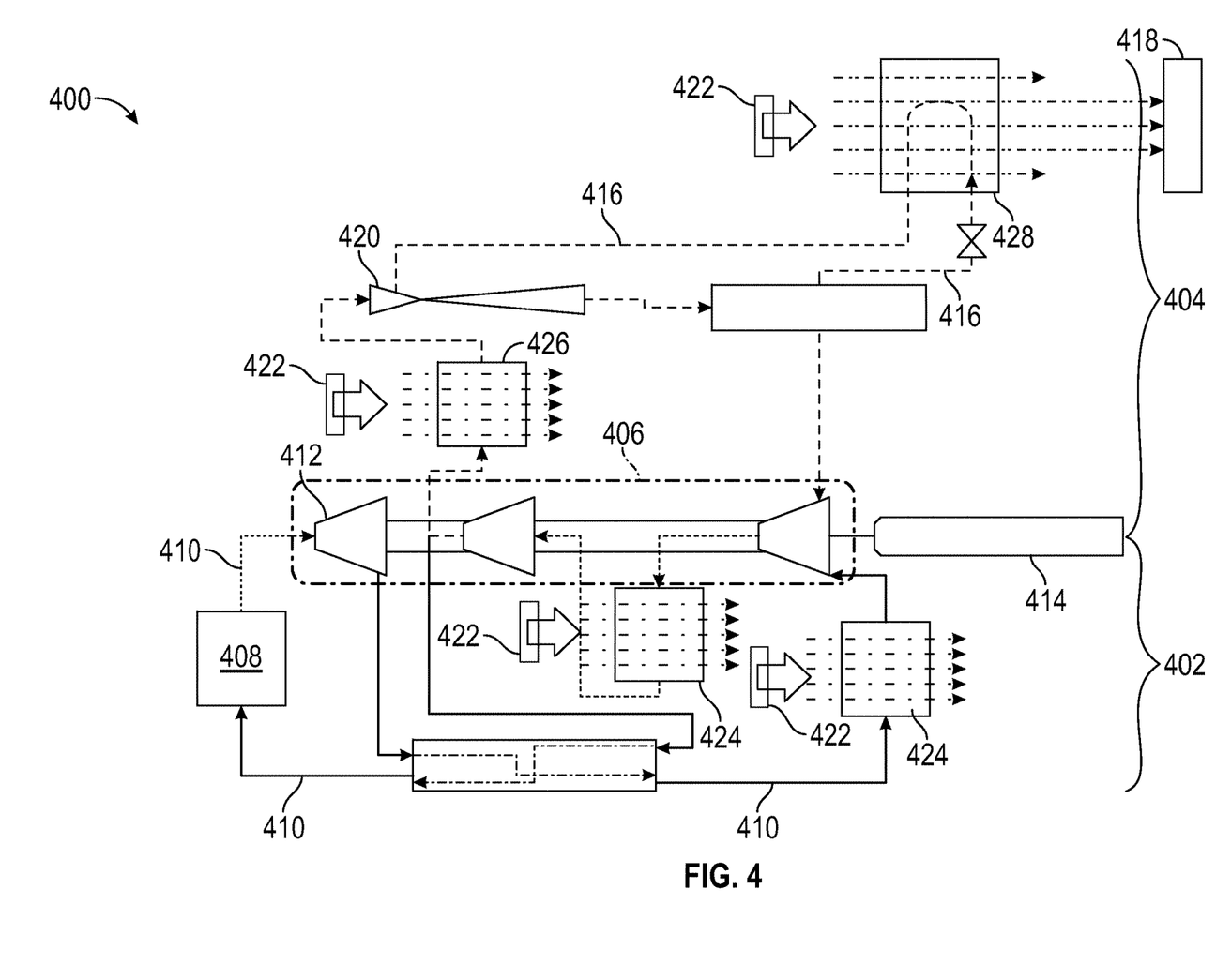
FIG. 4 is a schematic diagram of a power and cooling system in accordance with an embodiment of the present disclosure.

Turning now to FIG. 4, a schematic illustration of a power and cooling system 400 in accordance with an embodiment of the present disclosure is shown. The power and cooling system 400 is configured to generate power and generate cooled fluid for cooling a space, environment, or other components/systems. The power and cooling system 400 is substantially similar to that described above, having a power generation unit 402 and a cooled fluid generation unit 404, which are each operably connected to a central drive system 406. The power and cooling system 400 is configured to operate in a substantially closed-loop configuration using a supercritical primary working fluid (e.g., $sCO_2$). The primary difference between the power and cooling system 400 and the power and cooling system 100 of FIG. 1, is the motive or heating source. In the embodiment of FIG. 1, the heat is supplied from waste heat from a combustion system that may be configured for an alternative purpose (e.g., gas turbine engine onboard an aircraft for propulsive flight). However, in this alternative embodiment, the waste heat portion may be replaced by a dedicated burner or heater 408. In this case, the heater 408 may be a combustion heater (e.g., burner), electric heater, or other heat source, as will be appreciated by those of skill in the art.

In operation, the power and cooling system 400 operates substantially similarly as that described above. A power generation flow path 410 of a primary working fluid is used to drive a turbine 412 which can drive operation of a generator 414, with a substantially closed-loop cycle of the primary working fluid. A portion of the primary working fluid may be split to flow through a cooled fluid flow path 416 to generate cooled fluid (e.g., air) to be supplied to a space 418, similar to that described above, including use of an ejector 420.

In this embodiment, one or more fans or blowers 422 are arranged to direct the air used as a secondary working fluid at various locations through the power and cooling system 400. For example, the blowers 422 may be used to pass ambient air through one or more heat rejection heat exchanger 424, a condenser heat exchanger 426, and/or an evaporator heat exchanger 428. The blowers 422 may be electrically powered with electrical power supplied from the generator 414 of the power and cooling system 400. These blowers 422 may also be implemented within the configuration of FIG. 1, and thus the present disclosed configuration is not to be limiting, but rather is an example configuration.

Although illustratively shown in both power and cooling systems 100, 400, a first compressor 116 and a second compressor 118 are operably coupled to the drive shaft 112. However, in other configurations, more than two compressors may be incorporated, and, optionally, additional heat rejection heat exchangers may be incorporated as well.

Figure 5:
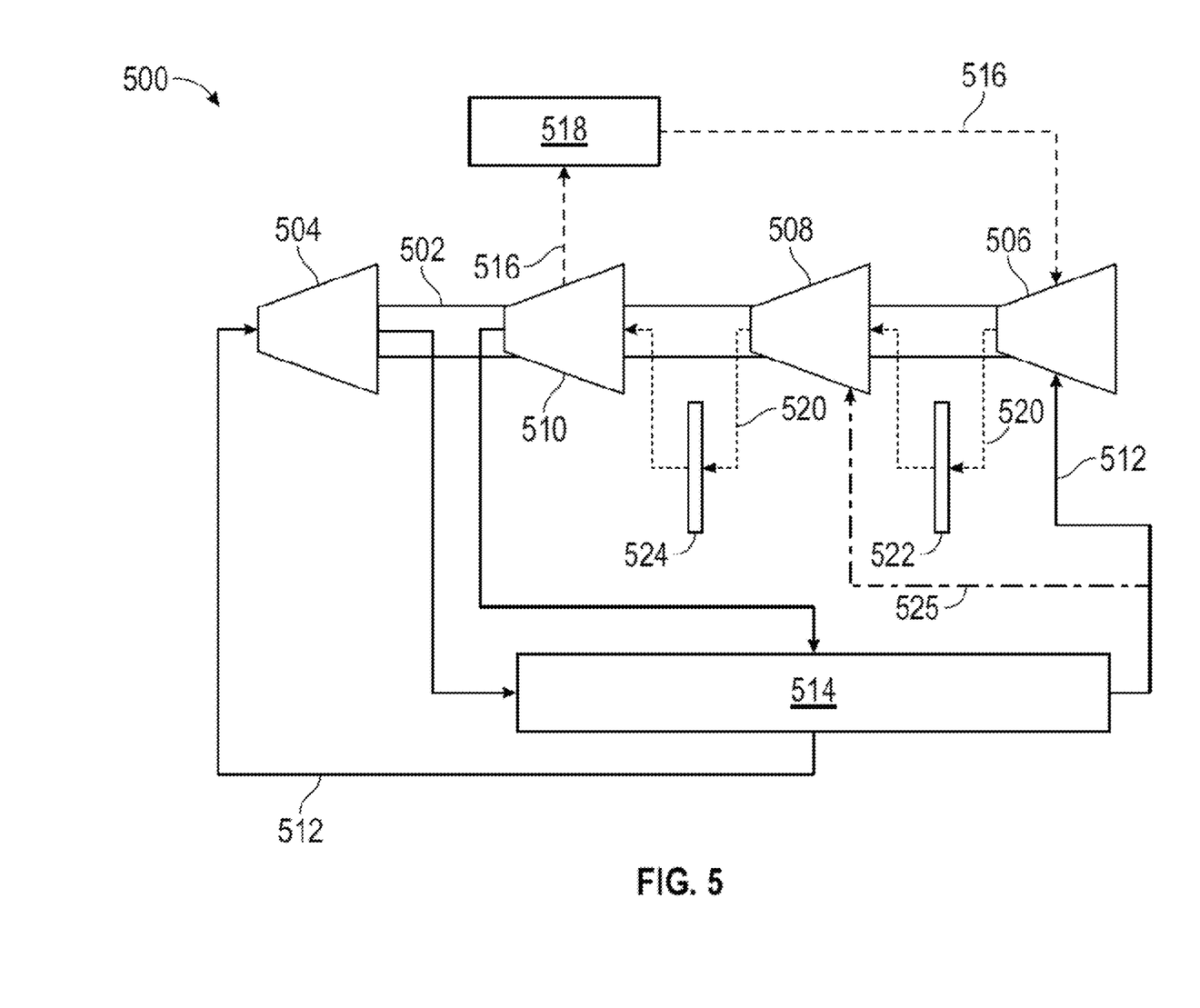
FIG. 5 is a schematic diagram of a portion of a power and cooling system in accordance with an embodiment of the present disclosure.

For example, turning now to FIG. 5, a schematic illustration of a drive system 500 of a power and cooling system in accordance with an embodiment of the present disclosure is shown. The drive system 500 includes a drive shaft 502 with a turbine 504, a first compressor 506, a second compressor 508, and a third compressor 510 operably connected thereto. The drive shaft 502 may be operably configured to drive a generator, as shown and described above. The turbine 504 and compressors 506, 508, 510 are arranged along flow paths of a primary working fluid, similar to that described above. For example, a power generation flow path 512 is arranged to carry a primary working fluid through a power generation unit 514. Similarly, a cooled fluid flow path 516 is arranged to carry a portion of the primary working fluid through a cooled fluid generation unit 518. The two flow paths 512, 516 are merged or combine at the first compressor 506, and the combined flow 520 flows through a first heat rejection heat exchanger 522 (e.g., similar to second heat rejection heat exchanger 128 of FIG. 1). The combined flow 520 is directed into the second compressor 508, through a second heat rejection heat exchanger 524, and into the third compressor 510. At the third compressor 510 a portion of the primary working fluid is extracted and directed along the cooled fluid flow path 516 for use within the cooled fluid generation unit 518. The remainder of the primary working fluid is passed to the power generation unit 514.

In this embodiment, the portion extracted for the cooled fluid generation unit is extracted at the last compressor in the series along the drive shaft. However, such extraction point is not to be limiting. For example, in some embodiments, the portion extracted for the cooled fluid generation unit may be pulled from the second compressor, with the remainder being passed through the additional (optional) heat rejection heat exchanger, and through the third compressor for the power generation unit. Further, in other embodiments, more compressors and/or heat rejection heat exchangers may be employed. Moreover, in some embodiments, one or more of the heat rejection heat exchangers may be omitted from between adjacent compressors along the flow path. The heat rejection heat exchangers and compressors may be provided and arranged to achieve desired temperature and/or pressure requirements for operation of both of the power generation unit and the cooled fluid generation unit. Additionally, the point of rejoining the two separate flows is not required to be at the first compressor in the series. For example, in another non-limiting configuration, the flow from the power generation unit may pass through a compressor prior to the merging of the two flows, which are then passed through a downstream compressor (or vice versa where the cooled fluid generation unit flow is compressed prior to the merging), as shown in FIG. 5 and flow path 525 illustrated thereon as an alternative flow configuration. As such, those of skill in the art will appreciate that different configurations are possible without departing from the scope of the present disclosure.

The use of the terms "a", "an", "the", and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. As used herein, the terms "about" and "substantially" are intended to include the degree of error associated with measurement of the particular quantity based upon the equipment available at the time of filing the application. For example, the terms may include a range of ±8%, or 5%, or 2% of a given value or other percentage change as will be appreciated by those of skill in the art for the particular measurement and/or dimensions referred to herein.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

Accordingly, the present disclosure is not to be seen as limited by the foregoing description, but is only limited by the scope of the appended claims.

What is claimed is:

1. A power and cooling system comprising
    a drive system having a drive shaft with a turbine, a first compressor, and a second compressor each operably coupled to the drive shaft;
    a power generation unit defining a power generation flow path of a primary working fluid that is expanded within the turbine of the drive system and compressed within the first compressor and the second compressor in a closed-loop cycle, the power generation unit comprising:
- a generator configured to generate electrical power, the generator driven by the drive shaft of the drive system; and
- a heat source configured to heat the primary working fluid prior to injection into the turbine; and
- a cooled fluid generation unit defining a cooled fluid flow path of a portion of the primary working fluid that is extracted from the second compressor and compressed within the first compressor, the cooled fluid generation unit comprising:
  - an ejector downstream of the second compressor along the cooled fluid flow path;
  - a separator arranged downstream of the ejector and configured to separate liquid and gaseous portions of the primary working fluid, wherein the gaseous portion is directed to the first compressor and the liquid portion is directed to an evaporator heat exchanger to generate a cooled fluid, wherein the primary working fluid is directed to the ejector after passing through the evaporator heat exchanger; and
  - a condenser heat exchanger arranged between the second compressor and the ejector along the cooled fluid flow path, wherein the condenser heat exchanger receives ambient air as a secondary working fluid to cool the primary working fluid prior to entry into the ejector.

2. The power and cooling system of claim 1, wherein the heat source is a combustion system and waste heat from the combustion system is passed through a hot gas-heat exchanger that is configured to heat the primary working fluid upstream of the turbine along the power generation flow path.

3. The power and cooling system of claim 2, wherein the combustion system is a gas turbine engine.

4. The power and cooling system of claim 3, wherein the gas turbine engine is configured to generate propulsive force for flight of an aircraft.

5. The power and cooling system of claim 2, wherein the combustion system is a diesel engine.

6. The power and cooling system of claim 1, wherein the heat source is a burner configured to heat the primary working fluid.

7. The power and cooling system of claim 1, wherein the primary working fluid is supercritical $CO_2$.

8. The power and cooling system of claim 1, wherein the cooled fluid generation unit comprises an expansion valve arranged between the separator and the evaporator heat exchanger.

9. The power and cooling system of claim 1, wherein the power generation unit comprises a recuperator heat exchanger arranged downstream from the turbine along the power generation flow path, wherein the recuperator heat exchanger is configured to receive two separate flows of the primary working fluid to enable heat exchange therebetween.

10. The power and cooling system of claim 9, wherein the power generation system comprises a heat rejection heat exchanger arranged downstream of the recuperator heat exchanger and upstream of the first compressor.

11. The power and cooling system of claim 1, further comprising a heat rejection heat exchanger arranged between the first compressor and the second compressor and configured to cool the primary working fluid.

12. The power and cooling system of claim 11, further comprising a blower configured to direct air into the heat rejection heat exchanger, wherein the blower is powered by the generator.

13. The power and cooling system of claim 1, wherein the cooled fluid is cooled air that is supplied to a passenger cabin of an aircraft.

14. The power and cooling system of claim 1, wherein the cooled fluid is cooled air that is supplied to a room of a building.

15. The power and cooling system of claim 1, further comprising an additional compressor arranged between the first compressor and the second compressor along the drive shaft.

16. The power and cooling system of claim 15, wherein the primary working fluid of the cooled fluid generation unit is merged with the primary working fluid of the power generation unit within the first compressor.

17. The power and cooling system of claim 15, wherein the primary working fluid of the cooled fluid generation unit is merged with the primary working fluid of the power generation unit within the additional compressor.

18. The power and cooling system of claim 1, wherein the portion of the primary working fluid that is extracted to the cooled fluid generation unit comprises no more than 20% of the primary working fluid within the power and cooling system.

19. A power and cooling system comprising
- a drive system having a drive shaft with a turbine, a first compressor, and a second compressor each operably coupled to the drive shaft;
- a power generation unit defining a power generation flow path of a primary working fluid that is expanded within the turbine of the drive system and compressed within the first compressor and the second compressor in a closed-loop cycle, the power generation unit comprising:
  - a generator configured to generate electrical power, the generator driven by the drive shaft of the drive system; and
  - a heat source configured to heat the primary working fluid prior to injection into the turbine;
- a cooled fluid generation unit defining a cooled fluid flow path of a portion of the primary working fluid that is extracted from the second compressor and compressed within the first compressor, the cooled fluid generation unit comprising:
  - an ejector downstream of the second compressor along the cooled fluid flow path; and
  - a separator arranged downstream of the ejector and configured to separate liquid and gaseous portions of the primary working fluid, wherein the gaseous portion is directed to the first compressor and the liquid portion is directed to an evaporator heat exchanger to generate a cooled fluid, wherein the primary working fluid is directed to the ejector after passing through the evaporator heat exchanger; and
- an additional compressor arranged between the first compressor and the second compressor along the drive shaft, wherein the primary working fluid of the cooled fluid generation unit is merged with the primary working fluid of the power generation unit within the additional compressor.

20. The power and cooling system of claim 19, wherein the primary working fluid is supercritical $CO_2$.

\* \* \* \* \*